United States Patent
Cedilnik et al.

(10) Patent No.: US 9,726,546 B2
(45) Date of Patent: Aug. 8, 2017

(54) DISTRIBUTED OPTICAL SENSING WITH TWO-STEP EVALUATION

(71) Applicant: AP Sensing GmbH, Böblingen (DE)

(72) Inventors: Gregor Cedilnik, Gäufelden (DE); Gerd Koffmane, Althengstett (DE)

(73) Assignee: AP Sensing GmbH, Böblingen (DE)

( * ) Notice: Subject to any disclaimer, the term of this patent is extended or adjusted under 35 U.S.C. 154(b) by 0 days.

(21) Appl. No.: 14/622,156

(22) Filed: Feb. 13, 2015

(65) Prior Publication Data

US 2015/0233767 A1 Aug. 20, 2015

(30) Foreign Application Priority Data

Feb. 19, 2014 (GB) .................................. 1402932.6

(51) Int. Cl.
*G01J 5/02* (2006.01)
*G01J 5/10* (2006.01)
(Continued)

(52) U.S. Cl.
CPC . *G01J 5/10* (2013.01); *G01J 3/44* (2013.01); *G01J 3/4412* (2013.01);
(Continued)

(58) Field of Classification Search
CPC ............. G01K 11/32; G01K 2011/324; G01K 15/005; G01D 5/35364; G01D 5/35383;
(Continued)

(56) References Cited

U.S. PATENT DOCUMENTS 5,113,277 A * 5/1992 Ozawa ................... G01K 11/32
374/E11.015
5,724,371 A * 3/1998 Magne .................. H01S 3/0675
372/102
(Continued)

FOREIGN PATENT DOCUMENTS

EP 0 300 529 A1 1/1989
EP 0 692 705 A1 1/1996
(Continued)

OTHER PUBLICATIONS

Hwang, Dusun, et al.; Novel Auto-Correction Method in a Fiber-Optic Distributed-Temperature Sensor Using Reflected anti-Stokes Raman Scattering, Optical Society of America, May 10, 2010, vol. 18, No. 10, Optics Express, pp. 1-8.
(Continued)

*Primary Examiner* — David J Makiya
*Assistant Examiner* — Taeho Jo
(74) *Attorney, Agent, or Firm* — Robert A. Blaha; Smith Tempel Blaha LLC

(57) ABSTRACT

According to an embodiment there is provided a distributed optical sensing apparatus for determining of a primary quantity along a waveguide, the distributed optical sensing apparatus comprising: an electromagnetic radiation source adapted for coupling electromagnetic radiation into the waveguide to thereby generate in the waveguide (e.g. by interaction with the waveguide) a first response radiation and a different second response radiation; a detector device adapted for providing a first measurement signal indicative of the first response radiation and a second measurement signal indicative of the second response radiation; an evaluation unit adapted for deriving a secondary quantity (e.g. a loss) based on the first measurement signal and the second measurement signal; the evaluation unit being further adapted for deriving the primary quantity based on the
(Continued)

secondary quantity and at least one of the first measurement signal and the second measurement signal.

20 Claims, 5 Drawing Sheets

(51) Int. Cl.
    *G01J 3/44*     (2006.01)
    *G01J 5/60*     (2006.01)
    *G01J 5/08*     (2006.01)
    *G01K 11/32*     (2006.01)
    *G01K 15/00*     (2006.01)
    *G01D 5/353*     (2006.01)

(52) U.S. Cl.
    CPC ............... *G01J 5/0818* (2013.01); *G01J 5/60* (2013.01); *G01K 11/32* (2013.01); *G01K 15/005* (2013.01); *G01D 5/35383* (2013.01); *G01K 2011/324* (2013.01)

(58) Field of Classification Search
    CPC .......... G01J 3/44; G01J 3/4412; G01J 5/0818; G01J 5/10; G01J 5/60; G01M 11/085
    USPC ...................................... 250/341, 1
    See application file for complete search history.

(56) References Cited

U.S. PATENT DOCUMENTS

| | | | |
|---|---|---|---|
| 6,542,228 B1* | 4/2003 | Hartog | G01M 11/3127 356/73.1 |
| 2003/0234921 A1* | 12/2003 | Yamate | G01K 11/32 356/73.1 |
| 2008/0013096 A1* | 1/2008 | Bernini | G01D 5/268 356/483 |
| 2008/0068586 A1* | 3/2008 | Kishida | G01B 11/18 356/32 |
| 2008/0297772 A1* | 12/2008 | Rogers | G01M 11/3118 356/73.1 |
| 2009/0103072 A1* | 4/2009 | Fromme | G01K 11/32 356/3 |
| 2009/0304322 A1* | 12/2009 | Davies | G01H 9/004 385/12 |
| 2010/0312512 A1 | 12/2010 | Ajgaonkar | |
| 2011/0228255 A1* | 9/2011 | Li | G01B 11/18 356/33 |
| 2011/0310925 A1* | 12/2011 | Agawa | G01K 11/32 374/161 |
| 2013/0070235 A1* | 3/2013 | Chen | G01L 11/025 356/73 |
| 2013/0194580 A1* | 8/2013 | Yuan | G01B 11/161 356/478 |
| 2013/0222811 A1* | 8/2013 | Handerek | G01M 11/3127 356/477 |
| 2013/0265569 A1* | 10/2013 | Le Floch | G01D 5/35364 356/73.1 |
| 2013/0271769 A1* | 10/2013 | Handerek | E21B 47/06 356/446 |
| 2014/0146850 A1* | 5/2014 | Kasajima | G01K 11/32 374/161 |
| 2014/0152982 A1* | 6/2014 | Gosteli | G01M 11/085 356/300 |
| 2014/0153611 A1* | 6/2014 | Kasajima | G01K 15/00 374/130 |
| 2014/0254629 A1* | 9/2014 | Shida | G01K 11/32 374/161 |
| 2015/0168253 A1* | 6/2015 | Chin | G01M 11/083 356/73.1 |
| 2015/0308923 A1* | 10/2015 | Chin | G01D 5/35364 356/73.1 |
| 2016/0025524 A1* | 1/2016 | Nikles | G01K 11/32 356/73.1 |

FOREIGN PATENT DOCUMENTS

| | | |
|---|---|---|
| EP | 1 876 435 A1 | 1/2008 |
| GB | 2184829 A | 7/1987 |
| GB | 2 400 906 A | 10/2004 |
| GB | 2426331 A | 11/2006 |
| GB | 2434641 A | 8/2007 |
| GB | 2477241 A | 7/2011 |
| WO | WO 2006/045340 A1 | 5/2006 |
| WO | WO 2009/092436 A1 | 7/2009 |
| WO | WO 2013/123655 A1 | 8/2013 |

OTHER PUBLICATIONS

Soto, Marcelo A. et al., High-Performance Raman-Based Distributed Fiber-Optic Sensing Under a Loop Scheme Using Anti-Stokes Light Only, IEEE Photonics Technology Letters, vol. 23, No. 9. May 1, 2011, pp. 534-536.
English translation of Abstract of EP 0 692 705 B1 and WO 2013/123655 A1.

\* cited by examiner

DISTRIBUTED OPTICAL SENSING WITH TWO-STEP EVALUATION

FIELD OF INVENTION

The present invention relates to the field of distributed optical sensing.

BACKGROUND

Distributed optical sensing systems are optoelectronic devices which measure the primary quantity, e.g. a temperature, by means of optical waveguides such as fibers functioning as linear sensors. For example, it is known to use the Raman effect to determine the temperature along the fiber which can be of several kilometers in length.

An article of D. Hwang et al., "Novel auto-correlation method in a fiber-optic distributed-temperature sensor using reflected AntiStokes Raman scattering", Optics Express 2010, Vo. 18, No. 10, p. 9747 ff. describes a method for auto-correction of fiber optic distributed temperature sensor using AntiStokes Raman back-scattering and its reflected signal is presented. This method processes two parts of measured signal. One part is the normal back scattered AntiStokes signal and the other part is the reflected signal which eliminate not only the effect of local losses due to the micro-bending or damages on fiber but also the differential attenuation. Because the beams of the same wavelength are used to cancel out the local variance in transmission medium there is no differential attenuation inherently. The auto correction concept was verified by the bending experiment on different bending points.

An article of Marcelo A. Soto et al., "High-Performance Raman-Based Distributed Fiber-Optic Sensing Under a Loop Scheme Using Anti-Stokes Light Only", IEEE Photonics Technology Letters, Vol. 23, No. 9, 2011. Both ends of a fiber have been connected to a sensor through a 1×2 optical switch, allowing pulses to be alternately sent in both forward and backward directions. The geometric averages of the normalized AntiStokes traces in both forward and backward directions are calculated. The loop scheme is described as being advantageous over a mirror scheme where the light pulses are reflected by a mirror due to the two-way optical path in the mirror scheme, but the rear end of the fiber must be accessible by the sensor.

WO 2006/045340 A1 relates to measuring a distributed physical property (T(x)) of an optical device under test (DUT). Therefore, a probing signal comprising a sequence of optical pulses at a transmission wavelength is launched into the DUT, a corresponding optical response returning from the DUT is detected and at least a first response signal at a first response Q wavelength range is separated from the optical response, wherein the first response wavelength range does not comprise the transmission wavelength, a first correlation function is determined y correlating the first response signal and the probing signal and the distributed physical property is determined on the base of the first correlation function.

The described method may further comprise separating a second response function at a second response wavelength and determining a second correlation function by correlating the second response signal and the probing signal, and determining the distributed physical property on the base of the first correlation function and the second correlation function.

EP 0 692 705 B1 discloses a method for evaluating optically backscattered signals for determining a temperature profile of a backscattering medium. The light of a light source is modulated in its amplitude with respect to time. The signals evaluated are subjected to Fourier transformation.

EP 0 300 529 A1 discloses a method of measuring temperature which comprises launching input pulses of light into a temperature sensing element and deriving the temperature at a position in the element from the intensity of light scattered at said position, a part of the element being maintained at a known temperature in order to provide a reference for deriving temperature measurements at other positions in the element, thereby to avoid difficulties with calibration of the apparatus used to carry out the method.

GB 2 400 906 A discloses a method of obtaining a distributed measurement which comprises deploying an optical fibre in a measurement region of interest, and launching into it a first optical signal at a first wavelength and at a high power level, a second optical signal at a second wavelength, and a third optical signal at the first wavelength and at a low power level. These optical signals generate backscattered light at the second wavelength arising from Raman scattering of the first optical signal which is indicative of a parameter to be measured, at the first wavelength arising from Rayleigh scattering of the first optical signal, at the second wavelength arising from Rayleigh scattering of the second optical signal, and at the first wavelength arising from Rayleigh scattering of the third optical signal. The backscattered light is detected to generate four output signals, and a final output signal is derived by normalizing the Raman scattering signal to a function derived from the three Rayleigh scattering signals, which removes the effects of wavelength-dependent and nonlinear loss.

WO 2009/092436 A1 relates to distributed temperature sensing using two wavelengths differing by Raman shift of a waveguide. In contrast to conventional single input wavelength approaches in which beams related to a Stokes line and an anti-Stokes line experience different attenuation and propagation velocity of the corresponding electromagnetic radiation beam (in time and/or in space) when traveling to a detector, exemplary embodiments apply sequential stimulus signals having frequencies f1 and f2, whereas f2−f1 is approximately v, v being the Raman shift of the material. A result is that the detector "sees" essentially the same attenuation and propagation velocity for both measurements, and fiber attenuation and dispersion effects can be cancelled out at least partially.

SUMMARY

In view of the above-described situation, there exists a need for an improved distributed optical sensing technique that enables to provide a high signal quality or accuracy for a primary quantity of interest (e.g. temperature), while substantially avoiding or at least reducing problems and disadvantages of the known distributed sensing techniques. This need may be met by the subject matter according to the independent claims. Advantageous embodiments of the herein disclosed subject matter are described by the dependent claims. Further, an increased measurement time associated with some of the methods (dual-wavelength needs measurement at a second wavelength or classical distributed optical sensing (e.g. distributed temperature sensing, DTS) needs additional time for Stokes radiation recording if not done simultaneously with AntiStokes radiation recording) can also be reduced by embodiments of the herein disclosed subject matter. Also the required power for a second wavelength laser can be reduced while a similar or better noise level can be achieved. So the benefit of the herein disclosed subject matter can be a better signal to noise ratio in the measurement result, a shorter measurement time or a lower power level of a radiation source—or any combination of them. A lower power level of a radiation source (e.g. a laser) further may reduce costs of the system. In the following "Stokes" is abbreviated with "S" and "AntiStokes" is abbreviated with "AS".

According to an embodiment of a first aspect of the herein disclosed subject matter there is provided a distributed optical sensing apparatus for determining of a primary quantity along a waveguide, the distributed optical sensing apparatus comprising: an electromagnetic radiation source adapted for coupling electromagnetic radiation into the waveguide to thereby generate in the waveguide (e.g. by interaction with the waveguide) a first response radiation and a second response radiation, the second response radiation being different from the first response radiation; a detector device adapted for providing a first measurement signal indicative of the first response radiation; the detector device being further adapted for providing a second measurement signal indicative of the second response radiation; an evaluation unit adapted for deriving a secondary quantity based on the first measurement signal and the second measurement signal; the evaluation unit being further adapted for deriving the primary quantity based on the secondary quantity and at least one of the first measurement signal and the second measurement signal.

According to an embodiment of a second aspect of the herein disclosed subject matter, a distributed optical sensing method for spatially distributed determining of a primary quantity along a waveguide is provided, the method comprising: coupling electromagnetic radiation into the waveguide to thereby generate a first response radiation and a second response radiation which is different from the first response radiation; providing a first measurement signal indicative of the first response radiation and a second measurement signal indicative of the second response radiation; deriving a secondary quantity based on the first measurement signal and the second measurement signal; and deriving the primary quantity based on the secondary quantity and at least one of the first measurement signal and the second measurement signal.

According to an embodiment of a third aspect of the herein disclosed subject matter, there is provided a computer program for controlling or executing the method according one or more embodiments of the herein disclosed subject matter when run on a data processing system such as a computer.

These aspects of the herein disclosed subject matter are based on the idea that the signal quality of the primary quantity may be increased by first deriving a secondary quantity which can be optimized different from the primary quantity. For example, the secondary quantity may be averaged over longer period of time than the primary quantity, if e.g. the secondary quantity changes slower with time than the primary quantity.

According to an embodiment, the first measurement signal is indicative of the spatial distribution of the generation of the first response radiation along the waveguide and the second measurement signal is indicative of the spatial distribution of the generation of the second response radiation along the waveguide.

According to an embodiment, the electromagnetic radiation is infrared radiation. However, it should be understood that the wavelength of the electromagnetic radiation is chosen to optimize relevant parameters for the application.

According to an embodiment, the evaluation unit is adapted for sampling the first measurement signal so as to generate a plurality of first values based on the first measurement signal; and the evaluation unit is adapted for sampling the second measurement signal so as to generate a plurality of second values based on the second measurement signal; wherein each of the first values and the second values corresponds to a spatial region of the waveguide.

According to an embodiment, the evaluation unit is adapted for deriving a value of the secondary quantity based on a first value out of the plurality of first values and based on a second value out of the plurality of second values, wherein the first value, the second value and the secondary quantity derived therefrom correspond to the same spatial region of the waveguide. For example, according to an embodiment, the secondary quantity is calculated as a function of the first value and the second value corresponding to the same spatial region.

According to an embodiment, deriving the value of the secondary quantity for a spatial region of the waveguide includes (i) calculating a ratio of the first value and the second value corresponding to the spatial region; and/or (ii) calculating the difference of the first value and the second value corresponding to the spatial region. According to an embodiment, deriving the value of the secondary quantity includes performing the aforementioned calculations (i) and/or (ii) on the logarithms of the respective values.

According to an embodiment, the secondary quantity is a quantity related to or derived from a loss along the waveguide of at least one of (i) the electromagnetic radiation, (ii) the first response radiation and (iii) the second response radiation.

According to an embodiment, the electromagnetic radiation includes a first electromagnetic radiation and a second electromagnetic radiation which differs from the first electromagnetic radiation, e.g. in wavelength.

According to an embodiment, hereinafter also referred to as dual wavelength method, the first values correspond to a first response radiation (e.g. to the AS response) from the first electromagnetic radiation of a first wavelength and the second values correspond to a second response radiation (e.g. to the S response) from the second electromagnetic radiation of a second wavelength, where optionally the second wavelength may be e.g. chosen to match the AS wavelength from the first wavelength (described in detail in WO 2009/092436 A1). The secondary quantity may then be represented e.g. by the geometric mean of the fiber loss at the first wavelength and at the second wavelength in linear space (in log space this corresponds to the arithmetic average). The secondary quantity may be calculated as the weighted difference (in linear space) between first values and second values as follows from the fundamental Raman theory. In this regard, "weighted" means that the first values and the second values shall be normalized to each other by a factor, accounting e.g. for different laser power, filter loss or detector responsivity of the apparatus. The primary quantity (e.g. temperature) may be calculated then from the first values (e.g. AS trace) and the secondary quantity (e.g. a loss trace).

According to a further embodiment, the evaluation unit is adapted for deriving a value of the primary quantity based on a value of the secondary quantity and at least one of (i) a first value out of the plurality of first values and (ii) a second value out of the plurality of second values, wherein the value of the secondary quantity, the at least one of the first value and the second value, and the value of the primary quantity derived therefrom correspond to the same spatial region of the waveguide.

According to an embodiment, deriving the value of the primary quantity for a spatial region of the waveguide includes correcting at least one of the first value and the second value corresponding to the spatial region based on the secondary quantity corresponding to the spatial region, thereby resulting in a first corrected value and/or a second corrected value corresponding to the spatial region.

According to an embodiment, correcting at least one of the first value and the second value is performed by calculating the first corrected value as a function of the first value and the secondary quantity and/or calculating the second corrected value as a function of the second value and the secondary quantity (all corresponding to the spatial region). The term "correcting" is used in this regard because according to an embodiment the first value and the second value include an undesired component, e.g. a loss component, which is at least partially removed by calculating the respective corrected first and/or second values, thereby resulting in a "correction" of the first value and/or second value.

According to an embodiment, deriving the primary quantity for a spatial region of the waveguide includes calculating the primary quantity as a function of at least one of the first corrected value corresponding to the spatial region and the second corrected value corresponding to the spatial region.

According to an embodiment, deriving the primary quantity for a spatial region of the waveguide includes calculating a weighted average of the first corrected value and the second corrected value corresponding to the spatial region, for example by calculating a weighted sum or a weighted product of the first corrected value and the second corrected value corresponding to the spatial region. According to an embodiment, the weight is chosen by the evaluation unit so as to improve the signal to noise ratio of the resulting primary quantity. In other embodiments, the weight is pre-programmed in the evaluation unit.

According to an embodiment, the evaluation unit is adapted for determining the weight of the first corrected value as a function of a signal quality associated with the respective first value from which the first corrected value is derived (i.e. which corresponds to the same spatial region) and/or for determining the weight of the second corrected value as a function of a signal quality associated with the respective second value from which the second corrected value is derived (i.e. which corresponds to the same spatial region). The signal quality may be determined on the basis of a signal involved in the generation of the respective first/second value or may be estimated (e.g. on the basis of a typical damping of the radiation in the fiber), e.g. by taking into account a part of or the entire signal processing chain, and may include at least one of noise level, signal to noise ratio, signal strength of the respective value. The noise that is involved with the generation of the respective first/second value may include one or more of the following: response radiation noise, noise due to the detector device, noise due to amplifiers, noise due to the analog-to-digital converter. According to an embodiment, the signal quality associated with the first value and/or the signal quality associated with the second value is determined from the digital signals (i.e. from the first value and the second value), e.g. by evaluating the strength (magnitude) of the respective value, e.g. by estimating the signal to noise ratio from the strength (magnitude) of the respective value. According to an embodiment, the evaluation unit is adapted for calculating the weight of the first value and the weight of the second value depending on the location within the waveguide to which the first value and the second value correspond.

According to an embodiment, the evaluation unit is adapted for deriving the value of the primary quantity temporally averaged over a first time duration and for deriving the value of the secondary quantity temporally averaged over a second time duration, wherein the first time duration is different from the second time duration. For example, according to an embodiment the first time duration is smaller than the second time duration. Due to the averaging over a longer time period, the noise in the secondary quantity can be reduced and hence the signal quality of the primary quantity can be increased. For example, according to an embodiment the first time duration is in the order of seconds and the second time duration is between two times and ten times the first time duration. For example, if the first time duration is ten seconds (10 s) the second time duration may be e.g. sixty seconds (60 s).

Therefore, applying the above described averaging scheme, the response to changes of the primary quantity is faster than the response to changes of the secondary quantity. However, this is reasonable for example in an embodiment where the primary quantity is e.g. a temperature to be measured and the secondary quantity is e.g. a quantity related to the loss along the waveguide because temperature changes usually occur faster than changes of the waveguide (e.g. fiber changes). It should be understood that for another primary quantity and/or another secondary quantity the averaging (i.e. the first time duration and the second time duration) has to be adapted to the particular application.

The averaging over different time durations may occur at different stages of the signal processing chain. For example, according to an embodiment a first (initial) averaging is performed during the generation of the first values based on the first measurement signal and during the generation of the second values based on the second measurement signal. For example, according to an embodiment the evaluation unit is adapted to generate a first value from a predetermined number of first measurement signals, e.g. from ten first measurement signals. In other words, according to an embodiment, the predetermined number of first measurement signals (e.g. ten first measurement signals) are averaged to generate the plurality of first values. The second values may be generated accordingly, i.e. from a predetermined number of second measurement signals. According to an embodiment, the first time duration corresponds to the time duration necessary to take both the predetermined number of first measurement signals and the predetermined number of second measurement signals. The predetermined number can be one (1), i.e. in this case the plurality of first values is generated from a single first measurement signal and the plurality of second values is generated from a single second measurement signal.

In order to provide for averaging of the secondary quantity over the (longer) second time duration, according to an embodiment and additional averaging step is introduced which only relates to the secondary quantity. It should be understood that in the above-mentioned exemplary embodiment the averaging over the first time period relates to both, the primary quantity and the secondary quantity as in this embodiment both, the primary quantity and the secondary quantity are derived on the basis of the first values and the second values.

Temporal averaging can be performed in any suitable way. According to an embodiment, the evaluation unit is further adapted for deriving the value (i.e. an actual final value) of the secondary quantity for a particular spatial region by deriving a preliminary value (i.e. an actual preliminary value) of the secondary quantity based on the first value and the second value corresponding to the particular spatial region; and the evaluation unit being further adapted for averaging the (actual) preliminary value of the secondary quantity with at least one earlier derived (e.g. the previous) preliminary value of the secondary quantity corresponding to the same particular spatial region. Averaging the (actual) preliminary value with at least one earlier derived preliminary value of the secondary quantity may be performed indirectly, including, according to an embodiment, averaging the (actual) preliminary value of the secondary quantity with an earlier value (i.e. an earlier final value) of the secondary quantity. According to an embodiment, the actual preliminary value is taken into account with a weight of 0.1 (10%) and the earlier final value is taken into account with a weight of 0.9 (90%). However, other weight ratios are also possible, e.g. 50/50. Taking into account the earlier final value is advantageous regarding storage requirements and required computation power since only the earlier final value has to be stored and to be taken into account in order to perform the averaging. Taking into account the earlier final value for performing averaging implicitly takes into account all earlier preliminary value with a weight that decreases with "age". Accordingly this averaging scheme may be referred to as exponential averaging.

According to another embodiment, averaging the (actual) preliminary value with at least one earlier a derived preliminary value of the secondary quantity may be performed directly, including averaging the (actual) preliminary value of the secondary quantity with an earlier derived preliminary value of the secondary quantity. In the sense of the above embodiments, according to an embodiment a preliminary value of the secondary quantity is calculated as a function of a single pair of a first value and a second value, whereas a final value of the secondary quantity is calculated as a function of two or more pairs of a first value and a second value, wherein each pair corresponds to the same spatial region and the two or more pairs correspond to different instants in time.

Temporal averaging of the primary quantity (if performed at all) may be performed in an analogous manner (formally described e.g. by replacing in the paragraph above the term "secondary quantity" by "primary quantity").

In accordance with embodiments disclosed herein, the secondary quantity may an undesired component of the first measurement signal and the second measurement signal, which is isolated (determined) from the first and second measurement signals, averaged over a time period longer than the desired temporal resolution of the primary quantity and the averaged secondary quantity is then removed from at least one of the first and second measurement signals to thus determine the primary quantity.

According to an embodiment, the difference between the first response radiation and the second response radiation resides in the propagation direction of the electromagnetic radiation from which the respective response radiation originates (this may be referred to as dual direction method). In other words, according to an embodiment the first response radiation originates from electromagnetic radiation propagating in a first direction along the waveguide and the second response radiation originates from electromagnetic radiation propagating in a second direction opposite the first direction. This may be achieved by any suitable means, e.g. as described with regard to the exemplary embodiments below.

According to an exemplary embodiment, the electromagnetic radiation is coupled into the waveguide at different locations. For example, according to an embodiment the electromagnetic radiation comprises a first electromagnetic radiation and a second electromagnetic radiation; the electromagnetic radiation source is adapted for coupling the first electromagnetic radiation into the waveguide at a first location of the waveguide to thereby generate the first response radiation; and the electromagnetic radiation source is adapted for coupling the second electromagnetic radiation into the waveguide at a second location of the waveguide to thereby generate the second response radiation. According to an embodiment, the second location is spaced apart from the first location. In another embodiment, the first location and the second location are identical, e.g. in case of the implementation of a dual-wavelength, single-ended method. It should be understood that the first electromagnetic radiation and the second electromagnetic radiation may be different in at least one of (i) the instant in time at which the respective electromagnetic radiation is coupled into the waveguide, (ii) the magnitude, (iii) the frequency (wavelength), etc. According to an embodiment, the electromagnetic radiation includes two selectable wavelengths, e.g. for a dual-wavelength method. According to an embodiment, the waveguide has a loop configuration wherein the first location and the second location are coupled to an optical switch which is configured for selectively coupling the electromagnetic radiation from the radiation source into one of the first location and the second location.

According to a further exemplary embodiment, the electromagnetic radiation source is adapted for coupling the first electromagnetic radiation and the second electromagnetic radiation into the waveguide with a temporal offset, e.g. for coupling the second electromagnetic radiation later that the first electromagnetic radiation into the waveguide. According to an embodiment the temporal offset is suitable for avoiding an adverse effect on the detection of the first response radiation (and/or the second response radiation) by the detector device and hence the generation of the first measurement signal (and/or the second measurement signal).

According to an embodiment, the waveguide has a first location and a spaced apart second location; the radiation source is adapted for coupling the electromagnetic radiation into the waveguide at the first location; the waveguide has a mirror at the second location; and the electromagnetic radiation generates the first response radiation before being reflected by the mirror and generates the second response radiation after being reflected by the mirror, the second response radiation propagating to the detector device via the mirror.

According to an embodiment, the electromagnetic radiation source is adapted for providing a pulsed electromagnetic radiation. For example, according to an embodiment the first response radiation is generated by a pulse of the electromagnetic radiation and the second response radiation is generated by a pulse of the electromagnetic radiation. The first response radiation and the second response radiation may be generated by the same pulse of electromagnetic radiation or by different pulses of electromagnetic radiation. According to an embodiment, the first response radiation and/or the second response radiation are generated by a single pulse of the electromagnetic radiation, two or more pulses of the electromagnetic radiation, or an electromagnetic radiation signal with a known pattern or modulation over time which allows the implementation of a coding method as described in WO 2006/045340 A1 or frequency domain method in EP 0 692 705 B1.

According to an embodiment, the secondary quantity is a radiation property (a property of e.g. the electromagnetic radiation, the first response radiation, the second response radiation, etc.) which is not dependent on the propagation direction of the radiation through the waveguide. For example, according to an embodiment the secondary quantity is an isotropic property of the waveguide or at least the property of the waveguide which is independent of the propagation direction of the radiation. According to an embodiment, the secondary quantity is a quantity related to or derived from a loss of at least one of the electromagnetic radiation, the first response radiation and the second response radiation along the waveguide. In this sense, loss is any change in the level (i.e. the magnitude) of the response radiation (or the measurement signal, or the respective value derived on the basis of the measurement signal) along the radiation path (including e.g. a coupling device) which does not result from a change in the primary quantity along the radiation path (or of the waveguide). According to an embodiment, the term "loss" as disclosed herein is the loss that occurs along the radiation path from the electromagnetic radiation source to the location in the waveguide, from which the respective response radiation originates, and back to the detector device. This loss may be referred to as "accumulated loss" and may be in the order of e.g. 9 dB for a 10 km distance between the electromagnetic radiation source and the location from which the response radiation originates. According to a further embodiment, the term "loss" as disclosed herein is the loss difference or the loss ratio between the loss for the S radiation and the loss for the AS radiation. The "accumulated loss—difference between the loss for the S radiation and the loss for the AS radiation" may be referred to as "differential loss" and may be in the order of e.g. 2.7 dB for a 10 km distance between the electromagnetic radiation source and the location from which the response radiation originates.

According to an embodiment, the first response radiation and the second response radiation result from at least one of fluorescence induced by the electromagnetic radiation, scattering, reflection or diffraction of the electromagnetic radiation, including in particular one or more of the following: Rayleigh scattering, Brillouin scattering, Raman scattering, Bragg scattering and Bragg reflection. According to an embodiment, the waveguide may comprise gratings, dispersed particles, etc. However, according to other embodiments, the waveguide may be free of artificial scattering centers such as gratings or particles as they are not necessary e.g. for Raman scattering. Generally, the "response" of the respective response radiation may reside in change in at least one of intensity, polarization, coherency, frequency, etc.

The primary quantity may be a quantity which corresponds to a desired physical quantity (e.g. which is proportional to the desired physical quantity or which is the desired physical quantity). According to an embodiment, the primary quantity corresponds to (e.g. is proportional to or is) one of temperature, strain, displacement, concentration of a substance, or irradiation strength (strength of external radiation impinging on the waveguide).

The apparatus or the method or the computer program may adapted for providing the functionality of one or more of the aforementioned embodiments and/or for providing the functionality as required by one or more of the aforementioned embodiments.

As used herein, reference to a computer program is intended to be equivalent to a reference to a program element and/or a computer readable medium containing instructions for controlling a computer system to effect and/or coordinate the performance of the method according to embodiments of the herein disclosed subject matter.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded. The computer program may be a stand-alone program or an update which provide the functionality of embodiments of the herein disclosed subject matter to an existing distributed optical sensing apparatus.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a distributed optical sensing apparatus and respective methods and computer programs. It has to be pointed out that of course any combination of features relating to different aspects of the herein disclosed subject matter is also possible. In particular, some features have been or will be described with reference to apparatus type embodiments whereas other features have been or will be described with reference to method type embodiments. However, a person skilled in the art will gather from the above and the following description that, unless otherwise notified, in addition to any combination of features belonging to one aspect also any combination of features relating to different aspects or embodiments, for example even combinations of features of apparatus type embodiments and features of the method type embodiments are considered to be disclosed with this application.

The aspects and embodiments defined above and further aspects and embodiments of the herein disclosed subject matter are apparent from the examples to be described hereinafter and are explained with reference to the drawings, but to which the invention is not limited.

DETAILED DESCRIPTION

Figure 1:
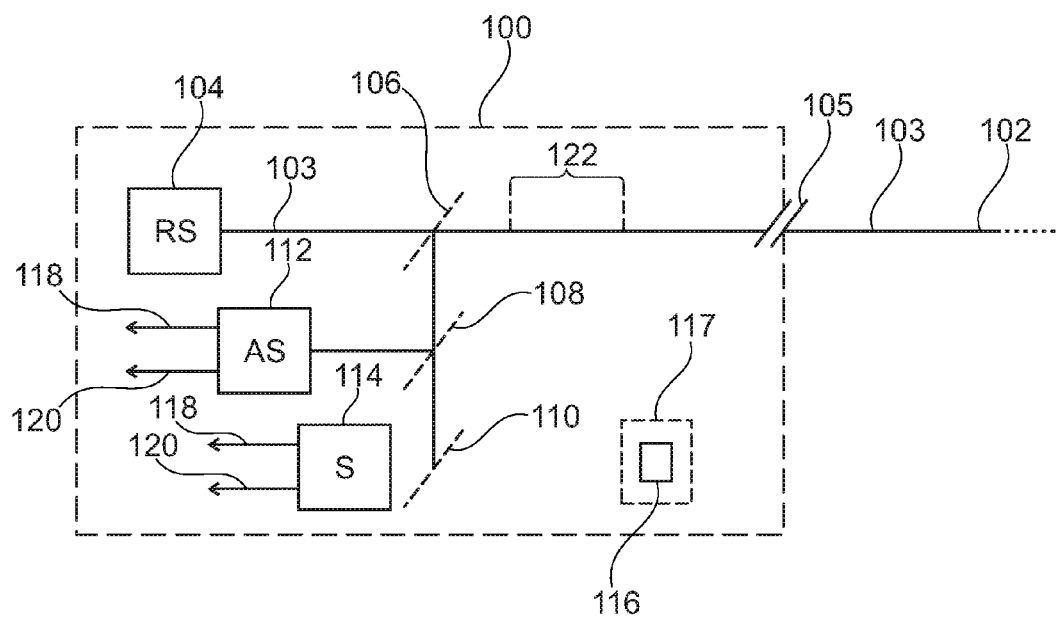
FIG. 1 shows a distributed optical sensing apparatus according to embodiments of the herein disclosed subject-matter.

The illustration in the drawings is schematic. It is noted that in different figures, similar or identical elements are provided with the same reference signs or with reference signs which are different from the corresponding reference signs only within the first digit. Further, the description of similar or identical features is not repeated in the description of subsequent figures in order to avoid unnecessary repetitions. However, it should be understood that the description of these features in the preceding figures is also valid for the subsequent figures unless noted otherwise.

In distributed optical sensing a quantity of interest is measured at different locations of a sensing waveguide (e.g. a sensing fiber). One example is the Raman-OTDR (Optical Time Domain Reflectometry) where a light pulse sent into an optical fiber induces known Raman back-scattering, as is explained with regard to FIG. 1 to FIG. 3 The backscattered signal returning back to the Raman-OTDR apparatus (which is a distributed optical sensing apparatus in accordance with an embodiment) is recorded over time by a detector resulting in a "trace" of amplitude over time, or, considering the propagation speed, over propagation path length. From the propagation path length the position "x" along the waveguide can be calculated.

Generally, Raman scattering is the inelastic scattering of a photon. Raman scattering has two contributions, a S band "S" which is shifted to higher wavelengths compared to the incident electromagnetic radiation and an AS band "AS" shifted to lower wavelengths compared to the incident electromagnetic radiation. Radiation in the S band is referred to as S radiation and radiation in the AS band is referred to as AS radiation.

FIG. 1 shows a distributed optical sensing apparatus according to embodiments of the herein disclosed subject-matter. According to an embodiment, the distributed optical sensing apparatus 100 is coupled, in operation, to a waveguide 102, e.g. an optical fiber. According to an embodiment, the apparatus 100 comprises an electromagnetic radiation source (RS) 104 adapted for coupling electromagnetic radiation into the waveguide 102. To this end, the apparatus 100 may comprise a connector 105 for coupling the waveguide 102 to the apparatus 100. When coupled to the connector 105, the waveguide 102 forms part of a radiation path 103 of the electromagnetic radiation. In the waveguide 102, the electromagnetic radiation interacts with the waveguide 102, thereby generating a first response radiation and a different, second response radiation. The interaction of the electromagnetic radiation with the waveguide may be any suitable interaction which is dependent on a primary quantity the spatial distribution of which along the waveguide 102 shall be determined with the apparatus 100. For example, according to an embodiment, the first response radiation and the second response radiation are generated by Raman scattering of the electromagnetic radiation. According to an embodiment, the first response radiation and the second response radiation are both AS radiation which has a higher temperature sensitivity than the S radiation. In another embodiment, the first response radiation and the second response radiation are both S radiation. For determining a primary quantity such as temperature, only AS radiation, S radiation or a ratio of S and AS radiation intensity may be evaluated.

According to an embodiment, the apparatus 100 comprises wavelength filters 108, 110 for separating the respective response radiation, e.g. the S radiation and the AS radiation from an incoming radiation. According to an embodiment, a splitter 106 is provided for directing the incoming radiation, originating from the waveguide 102, onto the wavelength filters 108, 110.

Raman scattering is suitable for detecting the temperature as a primary quantity along the waveguide 102 since the Raman scattering strength depends on a temperature in a way which is known from Raman scattering theory. Specifically, a rising temperature increases the S amplitude (i.e. the amplitude of the S radiation) and the AS amplitude (i.e. the amplitude of the AS radiation) and vice versa. According to an embodiment the first response radiation originates from electromagnetic radiation propagating in a first direction along the waveguide and the second response radiation originates from electromagnetic radiation propagating in a second direction opposite the first direction. Hence both (first and second) response radiations may both be provided in the S band and/or the AS band.

According to a further embodiment, the apparatus 100 comprises at least one detector device 112, 114 for providing a first measurement signal 118 indicative of the first response radiation and for providing a second measurement signal 120 indicative of a second response radiation. According to an embodiment, the apparatus 100 comprises a first detector device 112 e.g. for detecting the AS radiation and a second detector device 114 e.g. for detecting the S radiation. According to an embodiment, each detector device 112, 114 provides both, the first measurement signal 118 and the second measurement signal 120.

In a further embodiment (not shown in FIG. 1), a single detector device is provided to detect the first response radiation and the second response radiation and to provide a first measurement signal 118 indicative of the first response radiation and a second measurement signal 120 indicative of the second response radiation.

Irrespective of the number of detector devices, the first measurement signal and the second measurement signal are evaluated according to embodiments of the herein disclosed subject matter. If more than one set of measurement signals (comprising a first measurement signal and the second measurement signal) is available, e.g. from two or more detector devices (e.g. one for S radiation and one for AS radiation), then the additional sets of measurement signals can be used for improving accuracy. For example, if S radiation and AS radiation are detected and respective measurement signals are provided, then a S/AS ratio is determined. However, using only AS radiation is more cost efficient (e.g. because the S detector is not needed).

For evaluation of the first measurement signal and the second measurement signal the apparatus 100 comprises an evaluation unit 116. According to an embodiment, the evaluation unit is provided by a computer program running on data processing system 117 such as a computer. According to an embodiment, the apparatus 100 comprises the data processing system 117.

For simplicity and ease of understanding, in part of the following description only the evaluation of the first measurement signal 118 and the second measurement signal 120 generated by the first detector device 112 (detecting AS radiation) are described in further detail. However, it should be understood that the measurement signals 118, 120 provided by the second detector device 114 (from the S radiation) may be treated and evaluated in a similar way, thereby also providing the desired primary quantity and in particular its spatial distribution along the waveguide.

For easier understanding of the evaluation of the first measurement signal 118 and the second measurement signal 120, an exemplary procedure for evaluation on the basis of response radiation produced by Raman scattering is described and accordingly reference is made to S radiation and AS radiation. However, the concepts and embodiments discussed for response radiation produced by Raman scattering are valid for any other suitable response radiation and may be applied accordingly in respective applications which use a different response radiation.

In some embodiments, and in particular for providing absolute values of the primary quantity, e.g. the temperature, (and not only relative values thereof) the radiation path 103 includes a reference range 122 in which the primary quantity is at a known or otherwise determined value which may serve as a reference for calibration of the apparatus 100. For example, according to an embodiment a reference temperature sensor, e.g. an negative temperature coefficient (NTC) resistor (not shown in FIG. 1), may be provided for determining the temperature in the reference range 122 which may be used for the calibration.

Figure 2:
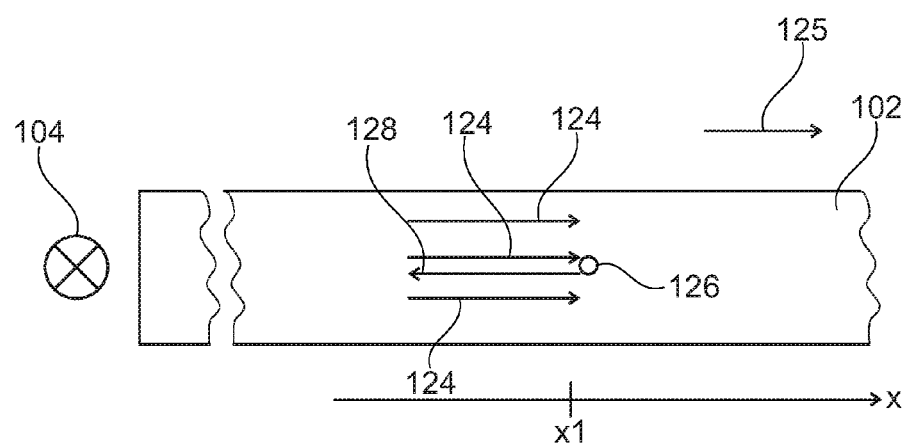
FIG. 2 illustrates the generation of the first response radiation in accordance with embodiments of the herein disclosed subject matter.

FIG. 2 illustrates the generation of the first response radiation in accordance with embodiments of the herein disclosed subject matter.

As illustrated in FIG. 2, an electromagnetic radiation 124 (propagating in the first direction 125 along the waveguide 102 away from the radiation source 104) generates, at a site 126, the first response radiation 128, e.g. by Raman scattering of the electromagnetic radiation 124 at the site 126. Due to the finite velocity of light the time duration between emission of the electromagnetic radiation 124 from the radiation source 104 and the reception of the first response radiation 128 at the detector device 112 (not shown in FIG. 2) is a measure for the position X1 of the site 126 along the waveguide. Hence, by taking into account the involved dimensions of the apparatus 100 the position X1 of the site 126 can be calculated (time of flight method).

Figure 3:
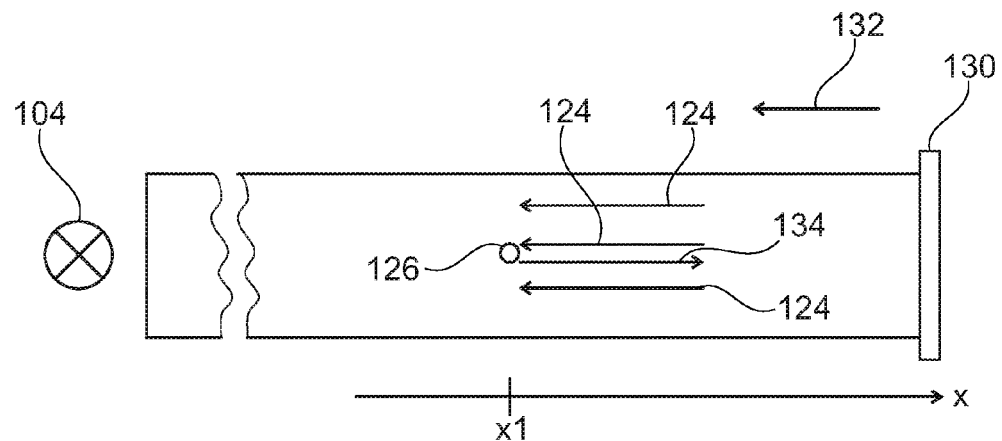
FIG. 3 illustrates the generation of the second response radiation in accordance with embodiments of the herein disclosed subject matter.

FIG. 3 illustrates the generation of the second response radiation in accordance with embodiments of the herein disclosed subject matter.

As mentioned above, according to an embodiment the second response radiation originates from electromagnetic radiation propagating in an opposite direction. This can be achieved with mirror 130 as shown in FIG. 3. FIG. 3 shows the electromagnetic radiation 124 at an instant in time where the electromagnetic radiation 124 has been reflected by the mirror 130 and hence propagates in a second direction 132 opposite to the first direction 125 (see FIG. 2). At the site 126 the reflected electromagnetic radiation 124 generates a second response radiation 134 which propagates back towards the mirror 130 and subsequently, after being mirrored, to the detector device 112 (not shown in FIG. 3). Since the second response radiation 134 has to travel a distance longer than the distance between the light source and the mirror 130, the second response radiation 134 is unambiguously defined and distinguishable from the first response radiation 128 by its time of flight.

According to an embodiment, as illustrated with regard to FIG. 2 and FIG. 3, the first response radiation 128 and the second response radiation 134 is back scattered radiation, i.e. is radiation that propagates into a direction opposite to the propagation direction of the electromagnetic radiation 124 from which it originates. Using backscattered radiation allows to use the time of flight method for establishing a correlation between the time instant of reception response radiation 128, 134 and the position X1 at the waveguide 102 from which it originates.

Instead of the mirror 130 shown in FIG. 2 and FIG. 3 two radiation sources located at opposite ends of an elongated waveguide may be used to generate electromagnetic radiation propagating in opposite directions. Another alternative for generating electromagnetic radiation propagating in opposite directions is a waveguide in a loop configuration, where both ends of the waveguide are located close to each other. In such a case, a single radiation source may be sufficient to couple the electromagnetic radiation into both ends of the waveguide (with suitable temporal offset).

According to an embodiment, two radiation sources at different wavelengths generate the first and second response radiation (without mirror, single-ended (i.e. the electromagnetic radiation is coupled into the waveguide only at a single end thereof)).

Figure 4:
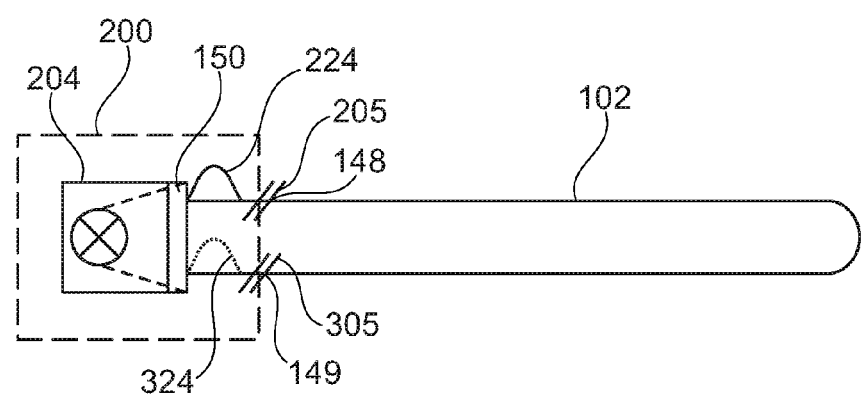
FIG. 4 shows another distributed optical sensing apparatus according to embodiments of the herein disclosed subject matter.

FIG. 4 shows another distributed optical sensing apparatus 200 according to embodiments of the herein disclosed subject matter.

In accordance with an embodiment, an electromagnetic radiation source 204 is adapted for coupling a first electromagnetic radiation 224 into the waveguide 102 at a first location 148 coupled to a first connector 205 of the apparatus 200, and for coupling a second electromagnetic radiation 324 into the waveguide 102 at a second location 149 coupled to a second connector 305. In accordance with an embodiment, the second location 149 is spaced apart from the first location 148. For example, if the waveguide 102 is coupled with both ends to the apparatus 200, the waveguide 102 shown in FIG. 4 is connected to the apparatus 200 in the so-called loop configuration, where both locations are spaced apart but are nonetheless close to each other. In accordance with an embodiment, the first electromagnetic radiation 224 and the second electromagnetic radiation 324 differ in the instant in time in which they are coupled into the waveguide 102. According to other embodiments, additionally or alternatively the first electromagnetic radiation 224 and the second electromagnetic radiation 324 may differ in another physical property. For realizing the coupling of the respective electromagnetic radiation 224, 324 into the waveguide with a temporal offset, a radiation switch 150 is provided which are capable of a selectively coupling first electromagnetic radiation 224 and the second electromagnetic radiation 324 into the waveguide 102. In accordance with an embodiment, the radiation switch 150 is controlled by the evaluation unit 116 (not shown in FIG. 4).

In accordance with an embodiment, the first electromagnetic radiation 224 coupled into the waveguide at the first location 148 generates the first response radiation 128 (not shown in FIG. 4) and the second electromagnetic radiation 324 coupled into the waveguide 102 at the second location 149 generates the second response radiation 134 (not shown in FIG. 4). In accordance with a further embodiment, the first electromagnetic radiation 224 and the second electromagnetic radiation 324 are provided in the form of infrared light pulses.

Next, the evaluation of the first response radiation and the second response radiation or the respective first measurement signal and the second measurement signal is described exemplarily for temperature as the primary quantity.

Figure 5:
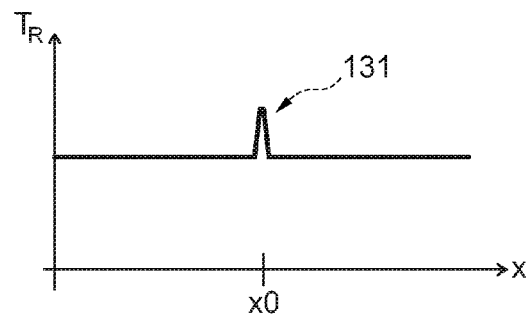
FIG. 5 shows an exemplary real temperature $T_R$ over a position x along the waveguide.

FIG. 5 shows an exemplary real temperature $T_R$ over a position x along the waveguide. As can be taken from FIG. 2, the real temperature $T_R$ is constant over the length of the waveguide except for a hotspot 131 at a location X0.

In the following, exemplary embodiments of the herein disclosed subject matter are described with reference to the distribution of the temperature $T_R$ of FIG. 5 and the resulting measurement signals. It should however be understood that the temperature distribution shown in FIG. 5 is in no way limiting and any real temperature distribution or, in a broader sense any distribution of the primary quantity along the waveguide, and the respective measurement signals can be evaluated as disclosed herein.

Figure 6:
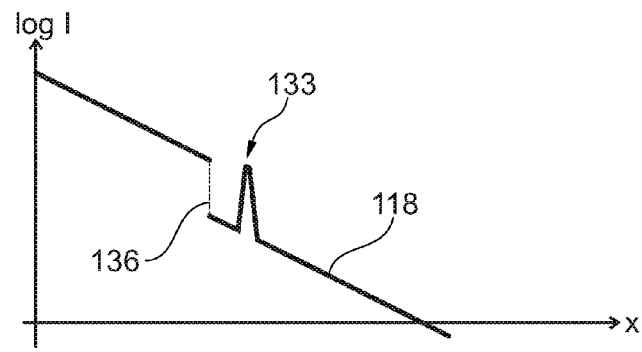
FIG. 6 shows on a logarithmic scale the intensity I of the first response radiation over a position x along the waveguide, obtained for the temperature distribution $T_R$ shown in FIG. 5.

FIG. 6 shows on a logarithmic scale the intensity I of the first response radiation, to which the first measurement signal 118 corresponds, over a position x along the waveguide, obtained for the real temperature distribution $T_R$ shown in FIG. 5. The hotspot 131 in the temperature distribution leads to a peak 133 in the measured intensity of the first response radiation (AS radiation in the example shown). While the intensity of the AS radiation is shown in FIG. 6, a ratio of S and AS radiation may also be used. In the illustrated example, the observed quantities (e.g. AS radiation, the S/AS radiation ratio) correspond to a virtual temperature. A step 136 in the intensity I of the first measurement signal 118 is due to the loss (or loss ratio in case a S/AS radiation intensity ratio is used) in the connector 105 (see FIG. 1) by means of which the electromagnetic radiation is coupled into the waveguide 102, e.g. a fiber. The decrease in intensity I over a distance X, resulting in the slope of the first measurement signal 118 in FIG. 6, is mainly due to fiber losses (or, more generally speaking, waveguide losses or, in case a S/AS radiation intensity ratio is used, a loss difference between S and AS radiation).

Usually, there are multiple factors determining the intensity level or the loss of intensity along the waveguide. Some factors like the light pulse strength or losses along the waveguide that are sufficiently similar for S and AS wavelength are easily cancelled out by calculating and using the ratio between S and AS trace. Other factors like different detector sensitivities for S and AS radiation or different losses for S and AS on the radiation path or any other effect that affects the ratio between S and AS level (or quantities related to them) by a single factor can be considered by feeding a known temperature value along one reference range into the temperature calculation. The calibration leads mainly to a vertical shift of the trace along the intensity axis in the logarithmic representation of the intensity over distance x. The reference range may be located at the beginning of the waveguide or internally in the apparatus 100, as the reference range 122 shown in FIG. 1.

Other factors are not handled this way. One example, if a S/AS radiation ratio is considered, is the loss of a connector which attenuates S and AS radiation differently and which changes the ratio of the S and the AS intensity behind the connector 105. The step in the S/AS intensity at the connector 105 results in a virtual temperature step if not compensated somehow. It may be compensated by feeding information on the loss difference (derived from other sources) to the measurement system.

Another example is the attenuation over distance of the waveguide which reduces the Raman signal over distance. Due to dispersion, this attenuation over distance is generally different between S and AS signal, so that also the ratio of both intensities (S/AS) changes over distance. The effect, if ignored, would for example lead to a virtual slope in the temperature trace on a waveguide even with a constant real temperature over its length. Often the attenuation ratio can be considered constant for the used waveguide and the slope can be compensated by feeding that waveguide attenuation ratio value into the calculation of the temperature (primary quantity). In some situations the attenuation ratio may be unknown, e.g. changing over time by ingression of hydrogen into the fiber in some environment, which would lead to an accuracy degradation in temperature determination.

One possibility to overcome the impact of an attenuation which is different for the S and the AS signal is a dual direction method where the Raman traces are measured in both directions, in forward direction (F) along the waveguide (corresponding to the first direction 125 in FIG. 2) and in the opposite backward direction (B), corresponding to the second direction 132 in FIG. 3.

Figure 7:
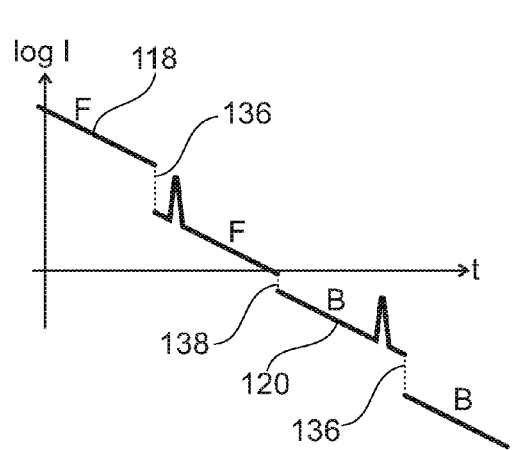
FIG. 7 shows a resulting intensity curve for a measurement in forward direction (F) and a measurement in backward direction (B) over time t according to embodiments of the herein disclosed subject matter.

FIG. 7 shows, over time t, an intensity curve for a measurement in forward direction (F) (which is the intensity of the first response radiation 128 represented by the first measurement signal 118) and an intensity curve for a measurement in backward direction (B) (which is the intensity of the second response radiation 134 represented by the second measurement signal 120) on a logarithmic scale according to embodiments of the herein disclosed subject matter.

The intensity curve in FIG. 7 shows the steps 136 arising due to the loss in the connector or 105 as well as a step 138 arising due to the loss in the mirror 130 (see FIG. 3).

Figure 8:
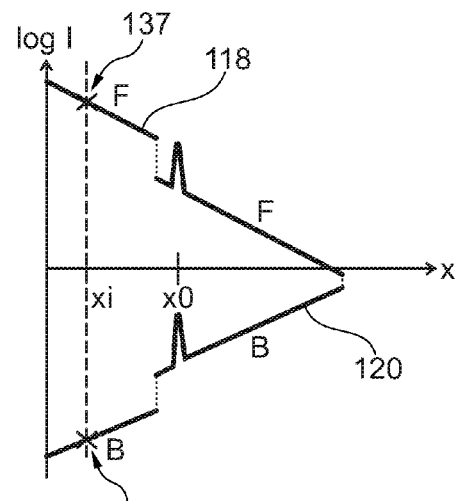
FIG. 8 shows t the intensity I of FIG. 7 over position x along the waveguide.

FIG. 8 shows the intensity I of FIG. 7 over position x along the waveguide. The intensity curve of FIG. 7 can be obtained e.g. by reflection of the curve of FIG. 7 with respect to an axis parallel to the intensity axis and through the step 138 which is due to the mirror 130.

Figure 14:
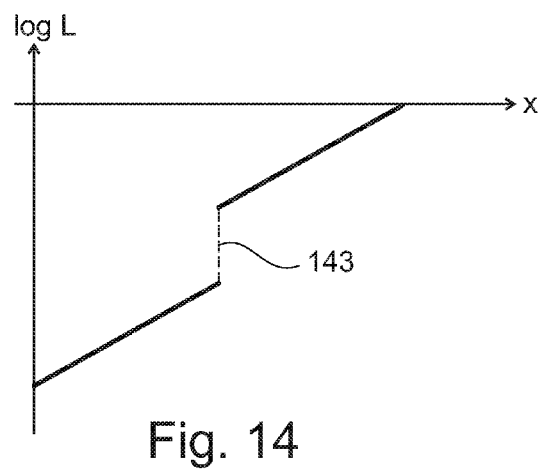
FIG. 14 shows, as a secondary quantity according to embodiments of the herein disclosed subject matter, the relative loss L in the logarithmic space over position x along the waveguide.

According to an embodiment, the F trace corresponds to (or consists of) a set of first values derived from the first measurement signal 118 (see FIG. 2) and the B trace corresponds to (or consists of) a set of second values derived from the second measurement signal 120 (see FIG. 3), wherein a pair of a first value and a second value corresponds to the same spatial region of the waveguide. One such pair of a first value 137 and a second value 139 corresponding to the same spatial region xi is exemplarily identified in FIG. 8. According to an embodiment, where the F trace and the B trace consist of a plurality of individual discrete values sampled from the measurement signals 118, 120, each first value of the F trace has associated therewith a second value of the B trace which corresponds to the same spatial region. It should be understood, that calculations according to embodiments of the herein disclosed subject matter may be performed on the individual pairs of a first value and a second value corresponding to the same spatial region of the waveguide. Accordingly, also the result value resulting from the calculation corresponds to the same spatial regions and a plurality of result values form a respective result trace, e.g. a relative loss trace as shown in FIG. 14.

While in the mirror configuration (see FIG. 2 in FIG. 3) the intensity continuously decreases over time t (FIG. 7) and hence the intensity for the measurement in forward direction (F) is higher than the intensity for the measurement in backward direction (B) (see FIG. 8), in the loop configuration the measurement in forward direction and the measurement in backward direction start at a similar intensity level.

Figure 9:
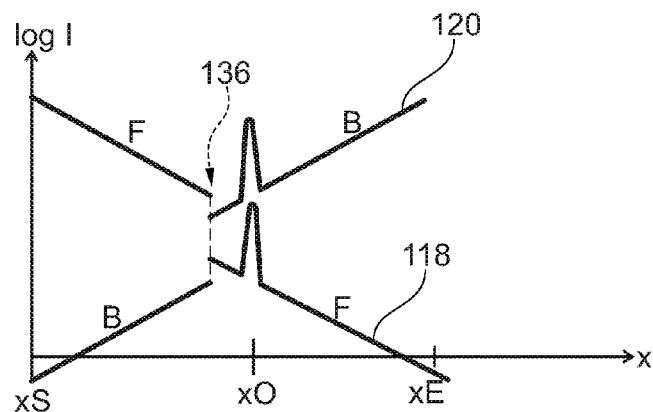
FIG. 9 shows a respective intensity I over position x for a loop configuration of the waveguide.

This is illustrated in FIG. 9 which shows a respective intensity I over position x a waveguide in a loop configuration, i.e. electromagnetic radiation is coupled into the waveguide from one side for the F trace and is coupled into the waveguide from an opposite site for the B trace. Except for vertical shift of the intensity curve for the measurement in backward direction (B) FIG. 8 and FIG. 9 correspond to each other. Any vertical offset of the whole Raman trace, which depends e.g. from the light pulse level, can be cancelled out by taking into account the reference range with its known reference temperature.

By combining the Raman traces which are measured in opposite the direction, i.e. by combining the Raman trace for the measurement in forward direction (F) and the Raman trace for measurement in backward direction (B) effects like the attenuation of the Raman signal in the wave guide over distance are cancelled out. The advantage of such a dual direction method is that attenuation of the Raman signal in the waveguide is not required to be known.

Figure 10:
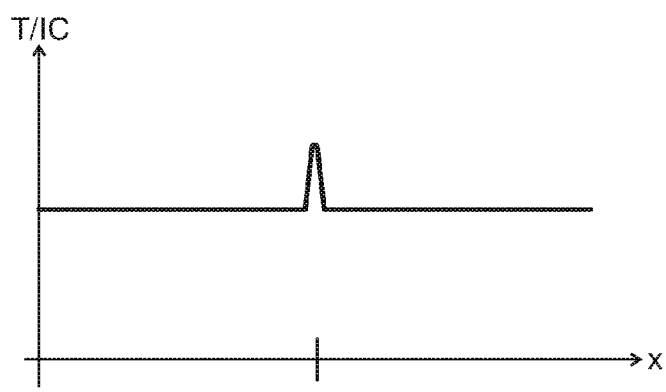
FIG. 10 shows the added (combined) intensity I of the Raman traces measured in forward direction and in backward direction.

FIG. 10 shows the added (combined) intensity IC of the Raman traces measured in forward direction and in backward direction, which corresponds to the desired primary quantity, the temperature T. As can be seen in FIG. 10, the dual direction approach is generally suitable for reproducing the real temperature, shown in FIG. 5, from the measured Raman traces.

One drawback of the dual direction approach is however an increase of noise for increasing propagation path length of the electromagnetic radiation and response radiation. The farther the distance the electromagnetic radiation (and back the response radiation) propagates within the waveguide, the lower the signal level becomes, leading to a worse signal-to-noise ratio (SNR).

Figure 11:
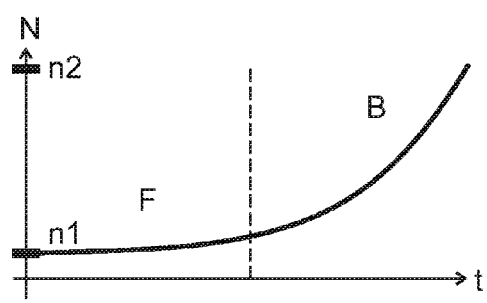
FIG. 11 shows the noise level N of the intensity curve shown in FIG. 7.

FIG. 11 shows an exemplary noise level N of the intensity curve shown in FIG. 7. The noise starts at a (relatively low) first level n1 in the vicinity of the radiation source and increases with the distance the electromagnetic radiation propagates until the response radiation is generated, e.g. up to a second level n2.

Figure 12:
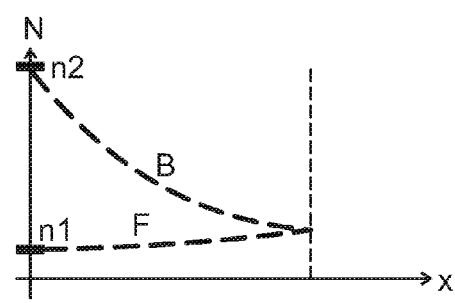
FIG. 12 shows the noise level N of FIG. 11 redrawn as a function of position x along the waveguide.

FIG. 12 shows the noise level N of FIG. 11 redrawn as a function of position x along the waveguide. When combining the Raman traces in the dual direction approach, a combined noise is obtained.

Figure 13:
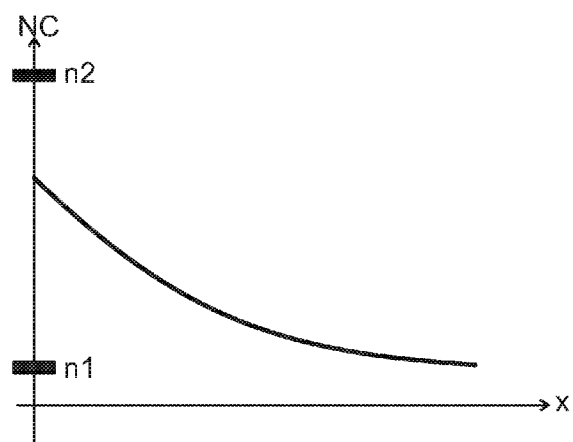
FIG. 13 shows the combined noise NC after combining (adding) the Raman traces measured in forward direction (F) and in backward direction (B).

FIG. 13 shows the combined noise NC after combining (adding) the Raman traces measured in forward direction (F) and in backward direction (B) in the logarithmic space. By combining both traces, values with better SNR are combined with values with worse SNR, leading to a SNR degradation, as illustrated in FIG. 13 compared to the values of trace with the better SNR alone. In particular combining of the Raman traces results in a noise level at the beginning of the waveguide (i.e. at low x values, close to the radiation source) which is far above the first level n1 of the corresponding Raman trace measured in forward direction.

In order to improve the signal-to-noise ratio, according to an embodiment the information within the recorded first and second measurement signals (e.g. the recorded Raman traces) is used to calculate the primary quantity of interest with the help of an additionally calculated secondary quantity that is based on the same information, but averaged over a time period which can be longer than the time period of the desired temporal resolution of the primary quantity. This is in particular suitable if the secondary quantity only changes slowly compared to the desired temporal resolution of the primary quantity. The additional calculation of the secondary quantity increases the required computation power but however provides an increased accuracy of the primary quantity on the same data basis (i.e. without requiring additional measurements to be performed).

For example, the secondary quantity can be the attenuation (i.e. the loss) of the first response radiation and/or the second response radiation along the waveguide (also referred to as waveguide attenuation).

Exemplarily, in the following reference is made to the AS amplitude (intensity).

FIG. 14 shows, as a secondary quantity according to embodiments of the herein disclosed subject matter, the relative loss L in the logarithmic space over position x along the waveguide. According to an embodiment these losses are calculated by subtracting the backward propagating trace from the forward propagating trace in the logarithmic space, divided by two, leading to a relative loss trace. This relative loss trace does not depend on the waveguide temperature, as any change of the AS amplitude by a temperature change happens in both the F trace and the B trace and thus cancels out when calculating the difference of the F trace and the B trace in the logarithmic space. Since log x−log y=log (x/y), instead of calculating the difference of the F trace and the B trace in the logarithmic space also the ratio of the F trace and the B trace in the linear space can be calculated.

According to an embodiment, the relative loss trace includes the stepwise loss change 143 originating from a connector, as shown in FIG. 14.

According to an embodiment this relative loss trace is averaged with several earlier measurements (e.g. previous relative loss traces) over a period over which the waveguide attenuation is sufficiently constant. The averaged relative loss trace has thus a better SNR than a single relative loss trace. According to an embodiment, the primary quantity is the temperature of the waveguide. The relative loss trace from above can be used to correct the AS trace of forward- and back propagation separately, as both are impacted by the loss in the same way. To perform the correction, according to an embodiment the averaged relative loss trace is added to the F trace and is subtracted from the B trace in the logarithmic space.

In this way the fiber loss or component loss impact is removed from each of the AS traces, F and B, and both traces bear mainly the temperature information and thus become flat if the waveguide is at constant temperature.

It is noted that an operation (e.g. subtraction, calculating a ratio) on two or more traces may be performed e.g. by performing the operation on corresponding values of the traces.

For the final temperature calculation, i.e. for the calculation of the primary quantity, the F trace and the B trace can be combined with the averaged relative loss trace in any suitable way, i.e. generally as a function of the F trace, the B trace and the averaged relative loss trace. For example, according to an embodiment the final temperature is derived by just taking the F trace, corrected by the averaged relative loss. According to a further embodiment, both the F trace and the B trace can be added with different weights at different locations so to reach the statistically best SNR. Here "correction" refers to the removal of undesired components (e.g. loss effects) from the respective trace. The weight f of the F trace and the weight b of the B trace may be chosen at each location within the waveguide as a function of at least one of noise level, signal to noise ratio, signal strength of the first measurement signal (from which the F trace is derived) and signal strength of the second measurement signal (from which the B trace is derived). Examples of the weights f and b are:

- f=1 and b=0 where the F trace has the preferred value (e.g. lower noise or stronger signal) compared to the B trace and vice versa
- $f=F^n/(F^n+B^n)$ and $b=B^n/(F^n+B^n)$, where n is any suitable positive or negative number.

Weighted adding of the F trace and the B trace may in particular be suitable for a loop configuration, where the noise at the beginning of the B trace is relatively low. For the mirror configuration (see FIG. 3) the F trace provides a lower noise over the entire length of the waveguide (see FIG. 11, FIG. 12) and hence it may be advantageous to use only or mainly the F trace for deriving the primary quantity in such a case.

While in the discussion of the aforementioned embodiments reference is made to the "traces" and intensities of the first response radiation (e.g. the F trace) and the second response radiation (e.g. the B trace), it should be understood that the respective calculations and combinations can be performed by the evaluation unit 116 in any suitable way, e.g. in the analogue domain. According to another embodiment, which is briefly set forth in the following, the evaluation of the first response radiation and the second response radiation can be performed on the basis of discrete values derived from the first measurement signal and the second measurement signal. For example, in an embodiment the evaluation unit is adapted for sampling the first measurement signal so as to generate a plurality of first values each of which corresponds to spatial region of the waveguide (i.e. a "position" along the waveguide). Further, the evaluation unit is adapted for sampling the second measurement signal so as to generate the plurality of second values each of which corresponds to a spatial region of the waveguide. According to an embodiment, the extent of the spatial region of the waveguide is about 1 m. This means that each of the first values or the second values is based on response radiation stemming from their spatial region. Hence, the respective response radiation is spatially averaged over the spatial region (e.g. over about 1 m) when generating the first and second values. A typical sampling rate for generating the first and second values is about 80 MHz.

According to an embodiment, a predetermined number of first measurement signals (e.g. ten first measurement signals) are averaged to generate the plurality of first values and a predetermined number of second measurement signals (e.g. ten second measurement signals) are averaged to generate the plurality of second values. Instead of averaging over a predetermined number of measurement signals, the averaging of the measurement signals is performed over a predetermined time interval (e.g. 10 seconds (s)). This initial averaging reduces the noise associated with the generated first and second values. It should however be understood that the initial averaging can be performed at the different stage of processing of the first and second measurement signals, e.g. after the generation of the first and second values. Due to the initial averaging, each quantity (primary quantity or secondary quantity) derived from the first and second values is subjected to a certain temporal averaging.

According to a further embodiment, the secondary quantity is averaged over longer time than the primary quantity. According to an embodiment this is achieved by further averaging the secondary quantity over time, in addition to the initial averaging. The further averaging of the secondary quantity over the time may be performed e.g. by calculating a preliminary value of the secondary quantity from a first value and a second value which both have been taken at second instant in time, and averaging the preliminary value of the secondary quantity with another preliminary value of the secondary quantity which has been a calculated from another first value and another second value which both have been taken at the first instant in time which is prior to the second instant in time. In order to further illustrate an exemplary averaging scheme according to embodiments of the herein disclosed subject matter, in the following the first thirty seconds of the evolution of a temperature distribution along the waveguide is described wherein the initial averaging is performed over ten seconds:

1. After ten seconds: A first AS trace (including a first F trace and a first B trace) is provided (after averaging the measurement signals over the ten seconds), a first relative loss trace is calculated from the first F trace and the first B trace and a first temperature distribution is calculated e.g. from the first F trace and the first relative loss trace. It is noted that in the particular example described the first relative loss trace corresponds to both a first preliminary relative loss trace and a first final relative loss trace as not further relative loss traces are available for averaging.
2. After twenty seconds: A second AS trace (including a second F trace and a second B trace) is provided (after averaging the measurement signals over the last ten seconds), a second preliminary relative loss trace is calculated from the second F trace and the second B trace, the second preliminary relative loss trace is averaged with the first relative loss trace in order to obtain a second final relative loss trace and a second temperature distribution is calculated e.g. from the second F trace and the second final relative loss trace.
3. After thirty seconds: A third AS trace (including a third F trace and a third B trace) is provided (after averaging the measurement signals over the last ten seconds), a third preliminary relative loss trace is calculated from the third F trace and the third B trace, the third preliminary relative loss trace is averaged with the second final relative loss trace in order to obtain a third final relative loss trace and a third temperature distribution is calculated e.g. from the third F trace and the third final relative loss trace. Using the previous (here the second) final (and not the preliminary) relative loss trace corresponds to an exponential averaging. In accordance with an embodiment, the weight of the previous (here second) final relative loss value is 0.9 and the weight of the actual (here third) preliminary relative loss trace is 0.1.

4. The procedure described under item 3. (after thirty seconds) is then repeated every 10 seconds by using the previous final relative loss trace and the actual preliminary relative loss trace for averaging, resulting in an actual final relative loss trace. Further, the actual F trace and the actual final relative loss trace are used to calculate the updated temperature distribution.

Instead of averaging an actual preliminary relative loss trace (e.g., in the example 3. above, the third preliminary relative loss trace) with the previous final relative loss trace (e.g., in the example 3. above, the second final relative loss trace), according to an embodiment the actual preliminary relative loss trace is averaged with one or more earlier preliminary relative loss traces (e.g. with the second preliminary relative loss trace).

Averaging as described above and herein can be the arithmetic average or the geometric average and may include calculating the average on the basis of weighted values (or weighted traces). For example, the (weighted) arithmetic average is then calculated according to the formula $$\text{actual final value} = \text{actual preliminary value} \cdot w_0 + \sum_i (\text{earlier preliminary } value_i \cdot w_i)$$

wherein the summation is performed over all earlier preliminary values (identified by the subscript i) which are taken into account for calculating the actual final value, starting from the previous preliminary value, and wherein $w_0$ denotes the weight for the actual preliminary value and $w_i$ denotes the weight for the respective earlier preliminary value. The sum of the weights is one ($w_0+\Sigma_i(w_1)=1$). According to an embodiment, the number of earlier preliminary values which are taken into account is a predetermined number, e.g. two, three, four, etc. According to another embodiment, all earlier preliminary values are taken into account. However, it should be understood that any averaging scheme may be used to generate an actual final (i.e. averaged) value of the secondary quantity, e.g. the relative loss.

Instead of referring to the whole trace, the above sequence could also be specified with reference to a pair of first and second values generated from an AS trace (or more generally, from the first and second measurement signal, respectively). In this sense and exemplarily for first ten seconds in item 1 above the sequence can respectively reworded wherein the term "first AS trace" is replaced by "pair of first and second values", the term "first relative loss trace" is replaced by "first relative loss value" and the term "first temperature distribution" is replaced by "first temperature value". The terms in items 2. to 4. above can be replaced accordingly to arrive at a corresponding description which refers to values instead of referring to traces. With the aforementioned replacements the first value is part of the first F trace and the second value is part of the first B trace wherein both, the first value and the second value of the pair correspond to a particular spatial region of the waveguide, the first relative loss value is part of the first relative loss trace and corresponds to the particular spatial region and the first temperature value is part of the first temperature distribution and corresponds to the temperature of the particular spatial region. It should be understood that, when values are considered instead of traces, the sequence has to be repeated for every pair of values of the traces.

In accordance with an embodiment, in the following examples the primary quantity is not subjected to a further averaging over time but only to the initial averaging (over a first time duration) in the course of generating the F trace and the B trace. The secondary quantity is subjected to further, exponential averaging if possible, i.e. if a previous final relative loss trace is available. The exponential averaging leads to averaging of the secondary quantity over a second time duration (not fixed, rather corresponds to the measuring time).

Figures 15, 16, 17:
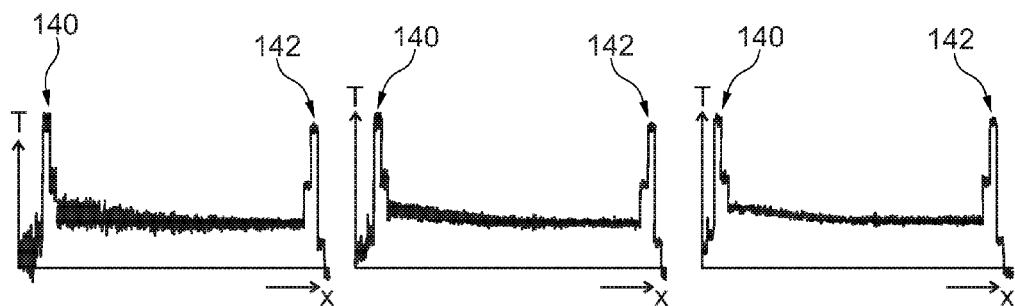
FIG. 15 shows, in accordance with embodiments of the herein disclosed subject matter, the temperature derived from a single set of first and second values (including initial averaging over 10 seconds), without further averaging of the secondary quantity.
FIG. 16 shows the temperature T derived with further (additional) averaging of the secondary quantity according to embodiments of the herein disclosed subject matter.
FIG. 17 shows the temperature T derived with still further (i.e. longer additional) averaging of the secondary quantity according to embodiments of the herein disclosed subject matter.

When performing the averaging of the primary quantity over a first time duration and the averaging of the secondary quantity over a second time duration which is longer than the first time duration, the signal quality of the resulting primary quantity can be increased, as shown in the sequence of FIG. 15, FIG. 16 and FIG. 17 where the temperature T (primary quantity) derived from measurement signals according to embodiments of the herein disclosed subject matter is shown over position x in the waveguide. The measurement signals on which FIG. 15 to FIG. 17 are based have been taken with a mirror configuration as explained above in particular with regard to FIG. 3. It is noted that the real temperature distribution along the waveguide comprises two double steps and a nearly constant temperature therebetween. These features of the real temperature distribution are well reproduced by the measured temperature traces and the double steps are indicated at 140, 142.

FIG. 15 shows, in accordance with embodiments of the herein disclosed subject matter, the temperature T derived from a single set of first and second values (including initial averaging over 10 seconds), without further averaging of the secondary quantity. Since no further averaging has been performed for both, the temperature (primary quantity) and the relative loss (secondary quantity) these quantities are averaged over the same time interval.

FIG. 16 shows the temperature T derived with further (additional) averaging of the secondary quantity according to embodiments of the herein disclosed subject matter. In particular, the temperature T in FIG. 16 is derived from four sets of first and second values, where further averaging is performed over the four sets of first and second values only for the relative loss. In other words, the temperature is not further averaged and hence has the same temporal resolution as the temperature of FIG. 15. However, as can be seen from FIG. 16, due to the further averaging of the relative loss (secondary quantity), the noise of the derived temperature is reduced to a large extent, in particular for low x values, i.e. locations close to the radiation source. As set forth with regard to FIG. 11 to FIG. 13, the noise for low x values increases due to the long propagation path for the B trace in the mirror configuration and the thus resulting low intensity of the response radiation of the B trace.

FIG. 17 shows the temperature T derived with still further (i.e. longer additional) averaging of the secondary quantity according to embodiments of the herein disclosed subject matter. In particular, the temperature T in FIG. 17 is derived from thirty-two sets of first and second values with corresponding averaging over of the relative loss over thirty-two sets of first and second values. Accordingly, the relative loss is averaged over a second time duration which is thirty-two times the first time duration over which the temperature is averaged. In summary, the first time duration (which determines the temporal resolution of the temperature) is the same for FIG. 15, FIG. 16 and FIG. 17 while the second time duration, over which the relative loss is averaged, is increased from 1 times the first time duration for FIG. 15 to four times the first time duration for FIG. 16 and finally to thirty-two times the first time duration for FIG. 17. As is readily seen from the noise in the temperature traces shown in FIG. 15, FIG. 16 and FIG. 17, the signal quality is increased due to the further averaging, in accordance with embodiments of the herein disclosed subject matter.

It should be understood, that although some embodiments refer to particular examples for some features in the claims, e.g. to the temperature as a primary quantity or to the AS radiation as first and second response radiation, etc., it should be understood that each of these references to a particular example (e.g. Temperature, AS radiation) is considered to implicitly disclose a respective reference to the general term (primary quantity, response radiation). It should be noted that where reference is made to AS radiation or the intensity thereof, according to other embodiments the S/AS radiation ratio or the intensity thereof is used. Further, while exemplary embodiments described herein refer to the time domain (e.g. in optical time domain reflectometry, OTDR), it should be understood that the herein disclosed subject matter is as well applicable to evaluation of the measurement signals in the frequency domain (e.g. to optical frequency domain reflectometry, OTDR), the concept of which is described e.g. in EP 0 692 705 A1.

Generally, according to embodiments of the invention any suitable entity (e.g. components, units, and devices) disclosed herein is at least in part provided in the form of a respective computer program (i.e. software) which enables a data processing device (e.g. a computer) to provide the functionality of the respective entity as disclosed herein. According to other embodiments, any suitable entity disclosed herein may be provided in hardware. According to other—hybrid—embodiments, some entities may be provided in software while other entities are provided in hardware.

It should be noted that neither the distributed optical sensing apparatus any other entity disclosed herein (e.g. components, units, and devices) are not limited to a dedicated entity as described in some embodiments. Rather, the herein disclosed subject matter may be implemented in various ways and with various granularity on device level or software module level while still providing the specified functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to still other embodiments, two or more entities (each of which may be e.g. a component, unit, subunit or device) are configured for providing together a function as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

Further, it should be noted that while the examples in the drawings include a particular combination of several embodiments of the herein disclosed subject matter, any other combination of embodiments is also possible and is considered to be disclosed with this application.

In order to recapitulate some of the above described embodiments of the present invention one can state: According to an embodiment there is provided a distributed optical sensing apparatus for determining of a primary quantity along a waveguide, the distributed optical sensing apparatus comprising: an electromagnetic radiation source adapted for coupling electromagnetic radiation into the waveguide to thereby generate in the waveguide (e.g. by interaction with the waveguide) a first response radiation and a different second response radiation; a detector device adapted for providing a first measurement signal indicative of the first response radiation and a second measurement signal indicative of the second response radiation; an evaluation unit adapted for deriving a secondary quantity (e.g. a loss) based on the first measurement signal and the second measurement signal; the evaluation unit being further adapted for deriving the primary quantity based on the secondary quantity and at least one of the first measurement signal and the second measurement signal.

LIST OF REFERENCE SIGNS 100, 200 distributed optical sensing apparatus
102 waveguide
103 radiation path
104, 204 electromagnetic radiation source
105, 205, 305 waveguide connector
106 splitter
108 wavelength filter
110 wavelength filter
112 detector device (AntiStokes, AS)
114 detector device (Stokes, S)
116 evaluation unit
117 processing system (e.g. processor device or a computer)
118 first measurement signal
120 second measurement signal
122 reference range
124, 224, 324 electromagnetic radiation
125 first direction
126 scattering site
128 first response radiation
130 mirror
131 hotspot (position of elevated temperature)
132 second direction
133 intensity peak due to 131
134 second response radiation
136 intensity step due to loss in a waveguide connector
137 first value
138 intensity step due to loss in a mirror
139 second value
140 double step in temperature
142 double step in temperature
148 first location of the waveguide
149 second location of the waveguide
150 optical switch

The invention claimed is:
1. A distributed optical sensing apparatus for determining of a primary quantity as a quantity of interest along an optical sensing waveguide, which is an optical device under test, wherein the spatial distribution of the primary quantity along the waveguide is to be determined with the apparatus, the distributed optical sensing apparatus comprising:
an electromagnetic radiation source adapted for coupling electromagnetic radiation into the waveguide to thereby generate in the waveguide a first response radiation and a second response radiation, the second response radiation being different from the first response radiation;

a detector device adapted for providing a first measurement signal indicative of the first response radiation;

the detector device being further adapted for providing a second measurement signal indicative of the second response radiation;

an evaluation unit adapted for deriving a secondary quantity based on the first measurement signal and the second measurement signal;

the evaluation unit being further adapted for deriving the primary quantity based on the secondary quantity and at least one of the first measurement signal and the second measurement signal;

the evaluation unit being further adapted for sampling the first measurement signal so as to generate a plurality of first values based on the first measurement signal;

the evaluation unit being further adapted for sampling the second measurement signal so as to generate a plurality of second values based on the second measurement signal;

wherein each of the first values and the second values corresponds to a spatial region of the waveguide;

the evaluation unit being further adapted for deriving a value of the primary quantity based on a value of the secondary quantity and at least one of a first value out of the plurality of first values and a second value out of the plurality of second values, wherein the value of the secondary quantity, the at least one of the first value and the second value, and the value of the primary quantity derived therefrom correspond to the same spatial region of the waveguide; and the evaluation unit being further adapted for optimizing, for said spatial region of the waveguide, the secondary quantity corresponding to said spatial region different from the primary quantity corresponding to said spatial region.

2. The distributed optical sensing apparatus of claim 1, the evaluation unit being adapted for deriving a value of the secondary quantity corresponding to said spatial region based on a first value out of the plurality of first values and based on a second value out of the plurality of second values, wherein the first value, the second value and the secondary quantity derived therefrom correspond to the said spatial region of the waveguide.

3. The distributed optical sensing apparatus of claim 1, wherein deriving a value of the secondary quantity for a spatial region of the waveguide includes:
(i) calculating a ratio of the first value and the second value corresponding to the spatial region; and/or
(ii) calculating the difference of the first value and the second value corresponding to the spatial region.

4. The distributed optical sensing apparatus of claim 1, the evaluation unit being adapted for deriving, for said spatial region of the waveguide, the value of the primary quantity corresponding to said spatial region temporally averaged over a first time duration and for deriving the value of the secondary quantity corresponding to said spatial region temporally averaged over a second time duration, wherein the first time duration is different from the second time duration.

5. The distributed optical sensing apparatus of claim 1, the evaluation unit being further adapted for deriving the value of the secondary quantity for a particular spatial region by deriving a preliminary value of the secondary quantity based on the first value and the second value corresponding to the particular spatial region; and the evaluation unit being further adapted for averaging the preliminary value of the secondary quantity with at least one earlier derived preliminary value of the secondary quantity corresponding to the same particular spatial region.

6. The distributed optical sensing apparatus of claim 1, wherein deriving the value of the primary quantity for a spatial region of the waveguide includes correcting at least one of the first value and the second value corresponding to the spatial region based on the secondary quantity corresponding to the spatial region, thereby resulting in a first corrected value and/or a second corrected value corresponding to the spatial region.

7. The distributed optical sensing apparatus of claim 6, wherein deriving the primary quantity for a spatial region of the waveguide includes
calculating the primary quantity as a function of at least one of the first corrected value corresponding to the spatial region and the second corrected value corresponding to the spatial region.

8. The distributed optical sensing apparatus of claim 7, wherein the evaluation unit is adapted for determining the weight of the first corrected value as a function of a signal quality associated with the respective first value from which the first corrected value is derived and/or for determining the weight of the second corrected value as a function of a signal quality associated with the respective second value from which the second corrected value is derived.

9. The distributed optical sensing apparatus of 1, the first response radiation originates from electromagnetic radiation propagating in a first direction along the waveguide and the second response radiation originates from electromagnetic radiation propagating in a second direction opposite the first direction.

10. The distributed optical sensing apparatus of claim 1,
the electromagnetic radiation comprising a first electromagnetic radiation and a second electromagnetic radiation;
the electromagnetic radiation source being adapted for coupling the first electromagnetic radiation into the waveguide at a first location of the waveguide to thereby generate the first response radiation;
the electromagnetic radiation source being adapted for coupling the second electromagnetic radiation into the waveguide at a second location of the waveguide to thereby generate the second response radiation.

11. The distributed optical sensing apparatus of claim 10, wherein the wavelength of the first electromagnetic radiation and the wavelength of the second electromagnetic radiation are different.

12. The distributed optical sensing apparatus of claim 10, the electromagnetic radiation source being adapted for at least one of the following:
coupling the first electromagnetic radiation and the second electromagnetic radiation into the waveguide with a temporal offset;
the second location is spaced apart from the first location.

13. The distributed optical sensing apparatus of claim 1,
the waveguide having a first location and a spaced apart second location;
the radiation source being adapted for coupling the electromagnetic radiation into the waveguide at the first location;
the waveguide having a mirror at the second location; and the electromagnetic radiation generating the first response radiation before being reflected by the mirror and generating the second response radiation after being reflected by the mirror, the second response radiation propagating to the detector device via the mirror.

14. The distributed optical sensing apparatus of claim 1, wherein the secondary quantity is a quantity related to or derived from a loss of at least one of the electromagnetic radiation, the first response radiation and the second response radiation along the waveguide.

15. The distributed optical sensing apparatus of claim 1, wherein the first response radiation and the second response radiation result from at least one of fluorescence induced by the electromagnetic radiation, scattering, reflection or diffraction of the electromagnetic radiation, including in particular one or more of the following: Rayleigh scattering, Brillouin scattering, Raman scattering, Bragg scattering and Bragg reflection.

16. The distributed optical sensing apparatus of claim 1, wherein the primary quantity is one of temperature, strain, displacement, concentration of a substance, or irradiation strength.

17. A distributed optical sensing method for spatially distributed determining of a primary quantity as a quantity of interest along an optical sensing waveguide, which is an optical device under test, wherein the spatial distribution of the primary quantity along the waveguide is to be determined by the method, the method comprising:
coupling electromagnetic radiation into the waveguide to thereby generate a first response radiation and a second response radiation which is different from the first response radiation;
providing a first measurement signal indicative of the first response radiation and a second measurement signal indicative of the second response radiation;
sampling the first measurement signal so as to generate a plurality of first values based on the first measurement signal;
sampling the second measurement signal so as to generate a plurality of second values based on the second measurement signal;
wherein each of the first values and the second values corresponds to a spatial region of the waveguide;
deriving a secondary quantity based on the first measurement signal and the second measurement signal;
deriving the primary quantity based on the secondary quantity and at least one of the first measurement signal and the second measurement signal;
wherein deriving the primary quantity comprises deriving a value of the primary quantity based on a value of the secondary quantity and at least one of a first value out of the plurality of first values and a second value out of the plurality of second values, wherein the value of the secondary quantity, the at least one of the first value and the second value, and the value of the primary quantity derived therefrom correspond to the same spatial region of the waveguide; and
wherein, for said spatial region of the waveguide, the value of the secondary quantity corresponding to said spatial region is optimized different from the value of the primary quantity corresponding to said spatial region.

18. The method of claim 17, wherein optimizing the value of the secondary quantity different from the value of the primary quantity comprises deriving, for said spatial region of the waveguide, the value of the primary quantity corresponding to said spatial region temporally averaged over a first time duration and deriving the value of the secondary quantity corresponding to said spatial region temporally averaged over a second time duration, wherein the first time duration is different from the second time duration.

19. A non-transitory computer-readable medium on which instructions are stored that when executed by an optical sensing apparatus direct the optical sensing apparatus to perform method steps, wherein the apparatus is for determining of a primary quantity as a quantity of interest along an optical sensing waveguide, which is an optical device under test, wherein the spatial distribution of the primary quantity along the waveguide is to be determined with the apparatus, the method steps comprising:
coupling electromagnetic radiation into a waveguide to thereby generate a first response radiation and a second response radiation which is different from the first response radiation;
providing a first measurement signal indicative of the first response radiation and a second measurement signal indicative of the second response radiation;
sampling the first measurement signal so as to generate a plurality of first values based on the first measurement signal;
sampling the second measurement signal so as to generate a plurality of second values based on the second measurement signal;
wherein each of the first values and the second values corresponds to a spatial region of the waveguide;
deriving a secondary quantity based on the first measurement signal and the second measurement signal;
deriving the primary quantity based on the secondary quantity and at least one of the first measurement signal and the second measurement signal;
wherein deriving the primary quantity comprises deriving a value of the primary quantity based on a value of the secondary quantity and at least one of a first value out of the plurality of first values and a second value out of the plurality of second values, wherein the value of the secondary quantity, the at least one of the first value and the second value, and the value of the primary quantity derived therefrom correspond to the same spatial region of the waveguide; and
wherein, for said spatial region of the waveguide, the value of the secondary quantity corresponding to said spatial region is optimized different from the value of the primary quantity corresponding to said spatial region.

20. A distributed optical sensing apparatus for determining of a primary quantity as a quantity of interest along an optical sensing waveguide, which is an optical device under test, wherein the spatial distribution of the primary quantity along the waveguide is to be determined with the apparatus, the distributed optical sensing apparatus comprising:
an electromagnetic radiation source adapted for coupling electromagnetic radiation into the waveguide to thereby generate in the waveguide a first response radiation and a second response radiation, the second response radiation being different from the first response radiation;
a detector device adapted for providing a first measurement signal indicative of the first response radiation;
the detector device being further adapted for providing a second measurement signal indicative of the second response radiation;
an evaluation unit adapted for deriving a secondary quantity based on the first measurement signal and the second measurement signal;

the evaluation unit being further adapted for deriving the primary quantity based on the secondary quantity and at least one of the first measurement signal and the second measurement signal;

the evaluation unit being further adapted for sampling the first measurement signal so as to generate a plurality of first values based on the first measurement signal;

the evaluation unit being adapted for sampling the second measurement signal so as to generate a plurality of second values based on the second measurement signal;

wherein each of the first values and the second values corresponds to a spatial region of the waveguide;

the evaluation unit being further adapted for deriving a value of the primary quantity based on a value of the secondary quantity and at least one of a first value out of the plurality of first values and a second value out of the plurality of second values, wherein the value of the secondary quantity, the at least one of the first value and the second value, and the value of the primary quantity derived therefrom correspond to the same spatial region of the waveguide; and the evaluation unit being further adapted for deriving, for said spatial region of the waveguide, the value of the primary quantity corresponding to said spatial region temporally averaged over a first time duration and for deriving the value of the secondary quantity corresponding to said spatial region temporally averaged over a second time duration, wherein the first time duration is different from the second time duration.

\* \* \* \* \*